United States Patent [19]

Hassler et al.

[11] Patent Number: 5,128,903
[45] Date of Patent: Jul. 7, 1992

[54] ULTRASOUND APPARATUS FOR THE VIRTUAL DIMINUTION OF THE ARRAY DIVISION OF A CONNECTABLE TRANSDUCER ARRAY

[75] Inventors: Dietrich Hassler, Uttenreuth; Guenter Temme, Spardorf, both of Fed. Rep. of Germany

[73] Assignee: Siemens Aktiengesellschaft, Berlin and Munich, Fed. Rep. of Germany

[21] Appl. No.: 626,443

[22] Filed: Dec. 12, 1990

[30] Foreign Application Priority Data

Dec. 22, 1989 [EP] European Pat. Off. ......... 89123788.5

[51] Int. Cl.$^5$ ............................................. G01S 15/00
[52] U.S. Cl. ..................................... 367/103; 367/105; 367/135; 367/138; 128/661.01; 73/626
[58] Field of Search ............... 367/103, 105, 135, 138, 367/903, 905; 128/662.03, 661.01; 73/626, 628, 618; 310/314

[56] References Cited

U.S. PATENT DOCUMENTS

| 4,409,982 | 10/1983 | Plesset et al. | 73/626 |
| 4,458,533 | 7/1984 | Borburgh | 73/626 |
| 4,542,653 | 9/1985 | Liu | 73/626 |

*Primary Examiner*—J. W. Eldred
*Attorney, Agent, or Firm*—Hill, Van Santen, Steadman & Simpson

[57] ABSTRACT

An ultrasound apparatus has a first group of transmission and reception channels that are respectively allocated to elementary transducer in the active aperture of a connectable transducer array. The central transmission location generated by a transmission channel and the reception location sampled by a reception channel coincide and lie on the allocated elementary transducer. In addition, a second group of transmission and/or reception channels is present, each being respectively simultaneously connectable to a plurality of elementary transducers via transmission and/or reception transfer stages for generating a virtual transmission and/or reception location that lies between the elementary transducers.

11 Claims, 2 Drawing Sheets

ULTRASOUND APPARATUS FOR THE VIRTUAL DIMINUTION OF THE ARRAY DIVISION OF A CONNECTABLE TRANSDUCER ARRAY

BACKGROUND OF THE INVENTION

1. Field of the Invention

The invention is directed to an ultrasound apparatus having a first group of transmission and reception channels, each of which is allocated to an elementary transducer in the active aperture of a connectable transducer array, wherein the central transmission location generated by a transmission channel and the central reception location sampled by a reception channel coincide and lie on the allocated elementary transducer.

2. Description of the Prior Art

U.S. Pat. No. 4,409,982 discloses an ultrasound apparatus having transmission and reception channels that are each allocated to an elementary transducer in the active aperture of a connectable transducer array. The respective central transmission and reception locations coincide and lie on the allocated elementary transducer. Each transducer is connectable via an analog multiplexer to a transmission or reception channel. The central transmission location is identical to the origin of the beam direction of the primary energy of an elementary transducer, whereas the central reception location is identical to the origin of the primary direction of sensitivity of an elementary transducer. The array division, i.e. the spacing of the elementary transducers on the transducer array, thus prescribes the spacing of the central transmission and reception locations.

Simulations and measurements at commercially available transducer arrays, particularly at "curved arrays" having a surface convexly curved in the emission direction, have shown that the dynamics of the dot image function is limited to approximately 40 dB through 50 dB. This is predominantly due to the relatively coarse divison of the array, for example a grid width of 0.75 mm (corresponding to the spacing of the central transmission and reception locations) at 3.5 MHz and given a radius of curvature of 70 mm. This dynamics limitation places a limit on the capability of ultrasound apparatus to recognize low contrast differences. It is desirable, however, to make the array division as fine as possible. This is because the more finely divided the transducer array, the better an electronic sweep or an electronic focusing can be implemented. A fine array division is the basis of an image presentation with high resolution. For reasons of outlay given extremely high-frequency arrays (7.5 MHz) and technological limits, because elementary transducers become extremely narrow, the number of elementary transducers cannot be arbitrarily increased in array systems. The result is that disturbances called grating lobes appear. Grating lobes arise due to the finitely fine, spatial quantization by the array division or, in other interpretations, due to diffraction at the grating grid of the array division.

SUMMARY OF THE INVENTION

It is thus the object of the invention to enhance the dynamics of the dot image function with a given array division, and thereby to increase the capability of the apparatus to recognize low contrast differences.

This object is achieved in accordance with the principles of the present invention in an ultrasound apparatus having a second group of transmission/reception channels, which are respectively simultaneously connectable to a plurality of transducer elements via transmission/reception transfer means for generating a virtual, central transmission/reception location lying between the elementary transducers.

Virtual, central transmission/reception locations lying between elementary trnasducers are thereby generated in addition to the central transmission and reception locations lying on the transducers. The array division is thus virtually rendered finer; the elementary transducer density on the array seems to be nearly doubled. Grating lobes are thus less disturbing. The dynamics of the dot image function is increased and the apparatus can recognize low contrast differences more precisely.

The greatest gain in the dynamics of the dot image function is achieved when both the virtual, central transmission locations and the virtual, central reception locations are generated between the elementary transducers. This requires the approximate doubling of the transmission and reception channels.

A solution having less equipment outlay, but at the expense of less of a gain in the dynamics of the dot image function, is achieved in respective embodiments wherein either only virtual central transmission locations or only virtual, central reception locations are generated. The outlay of reception or transmission channels is correspondingly reduced.

In a further embodiment for generating a transmission and reception location on the allocated transducer, only that transducer is activated, as also occurs in the initially cited prior art. The virtual transmission reception locations lying between the physically existing transducers are respectively generated by simultaneous activation of the transducers lying proximate thereto. In alternation, thus, one to two elementary transducers are simultaneously driven or sampled.

In a further embodiment the alternation of the simultaneously driven or sampled elementary transducers is expanded to two or three. A balancing of the different sensitivity that is caused by the alternating activation of two or three elementary transducers is less necessary in this embodiment than in the embodiment wherein one or two elementary transducers are activated in alternation.

In the solutions proposed herein, a transducer array having a division according to the current state of the art can be employed unmodified. The resolution in the image portrayal is noticeably improved due to the virtual generation of nearly twice as fine an array division. This represents a significant simplification for transducer technology, cables and plugs. A further advantage is the ability to connect transducer arrays already in the possession of the user to units as disclosed herein. In any case, a noticeable gain in dynamics of the dot image function is achieved compared to a device having a low number of channels.

DESCRIPTION OF THE PREFERRED EMBODIMENTS

Figure 1:
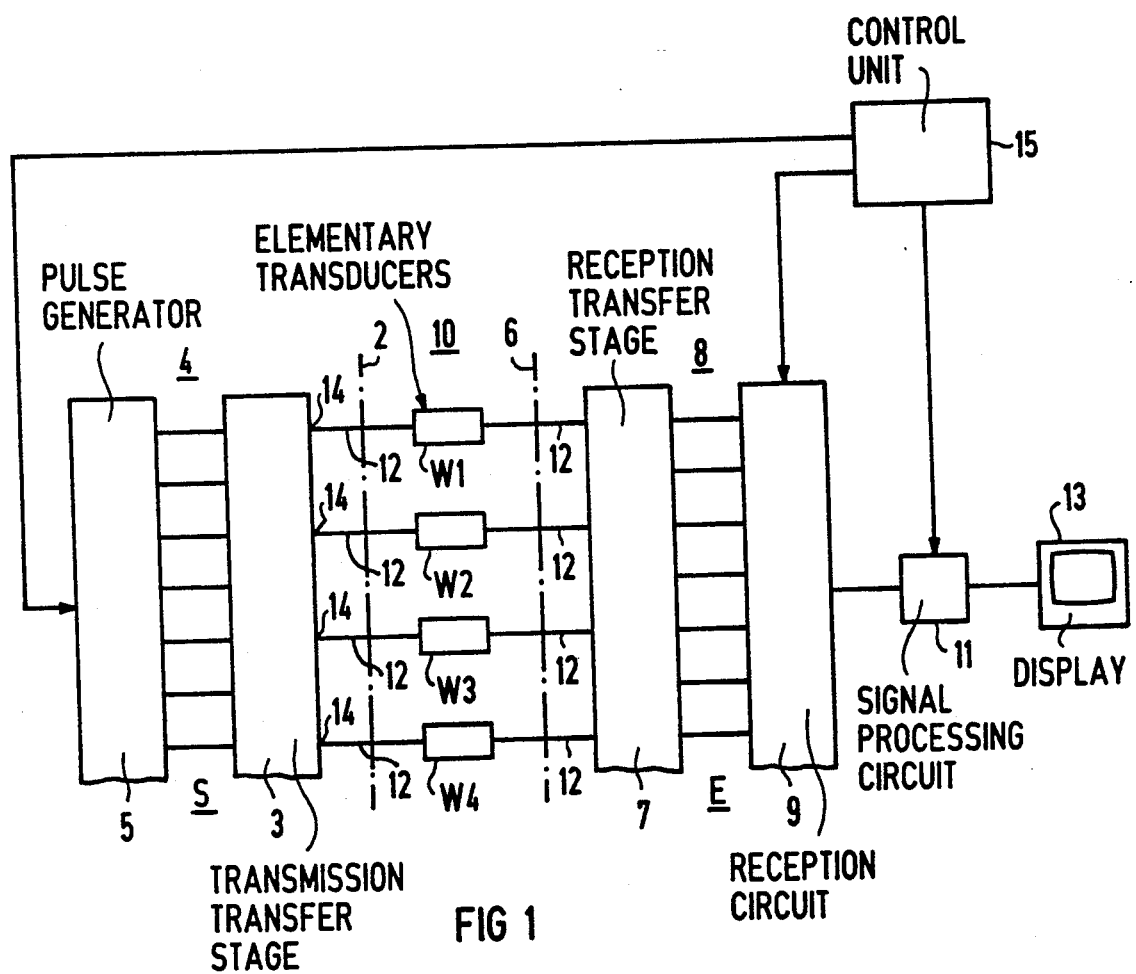
FIG. 1 is an overall schmetic block diagram of an ultrasound apparatus constructed in accordance with the principles of the present invention.

The structure of an ultrasound apparatus embodying the invention is shown in general form in FIG. 1. The transmission side 4 is shown to the left of a dot-dash line 2 and the reception side 8 of the ultrasound apparatus is shown to the right of a dot-dash line 6. An ultrasound applicator having a transducer array 10 can be connected to the transmission and reception side 4 or 8. The transducer array 10 is composed of elementary transducers W1, W2, W3 ... arranged following one another in a row. The connection of the elementary transducers W1, W2, W3 ... to the ultrasound apparatus ensues via connecting channels 12.

It is adequate, of course, to connect each transducer to only one connecting channel 12, which is then connected to the transmission side 4 as well as to the reception side 8 in the ultrasound apparatus. The number of connecting channels 12 is equal to the number of elementary transducers in the active aperture.

For the implementation of a linear scan, the active aperture is composed of a group of elementary transducers W1, W2, W3 ... that are advanced step-by-step across the array 10 for scanning along parallel scan beams. For the implementation of a sector scan having an array 10 (curved array) convexly curved in the scanning direction, an active aperture that covers fewer transducer elements W1, W2, W3 ... than present in the overall array is likewise advanced step-by-step. The active aperture, however, can also cover all transducer elements W1, W2, W3 ... of the array 10, which are then driven with electronic sweep and/or electronic focusing for the implementation of an electronic sector scan.

In accord with the invention, the connecting channels 12 are connected to outputs 14 of a transmission transfer stage 3. At its input side, the transmission transfer stage 3 is connected to transmission channels S which are nearly twice as many as the number of connecting channels 12. The transmission channels S forward transmission pulses that are generated by a pulse generator 5. The pulse generator can, as needed, shift the transmission pulses on the individual transmission channels S relative to one another such that an electronic sweep and/or an electronic focusing of the ultrasound scanning ensues in the examination region. The structure and the function of the transmission transfer stage 3 shall be set forth below with reference to FIGS. 2 and 3.

The reception side 8 is constructed similarly to the transmission side 4. At the reception side 8, the connecting channels 12 are connected to reception transfer stage 7. At its output side, the reception transfer stage 7 is connected to reception channels E, which are nearly twice as many as the number of connecting channels 12 or transducer elements W1, W2, W3 .... Here, the number of reception channels E is equal to the number of transmission channels S. The structure and the function of the reception transfer stage 7 shall also be set forth below with reference to FIGS. 2 and 3.

The reception channels E conduct the echo signals to a reception circuit 9 that forms a reception signal from the echo signals of the elementary transducers W1, W2, W3 ... after a suitable delay. This reception signal is representative of a focused scanning along a scan line. The delays can also be selected such that the scan line has a prescribable angle relative to the surface of the array 10, i.e. is electronically swept. The reception signal of the reception circuit 9 is further processed in a following signal processing circuit 11. The signal is edited therein such that it can be portrayed on a screen 13. A tomogram of the examination area as well as individual or additional blood flow information can be portrayed.

A control unit 15 is provided for controlling the functions in the ultrasound apparatus. It controls both the events at the transmission and reception sides 4 and 8, as well as the image portrayal.

Figure 2:
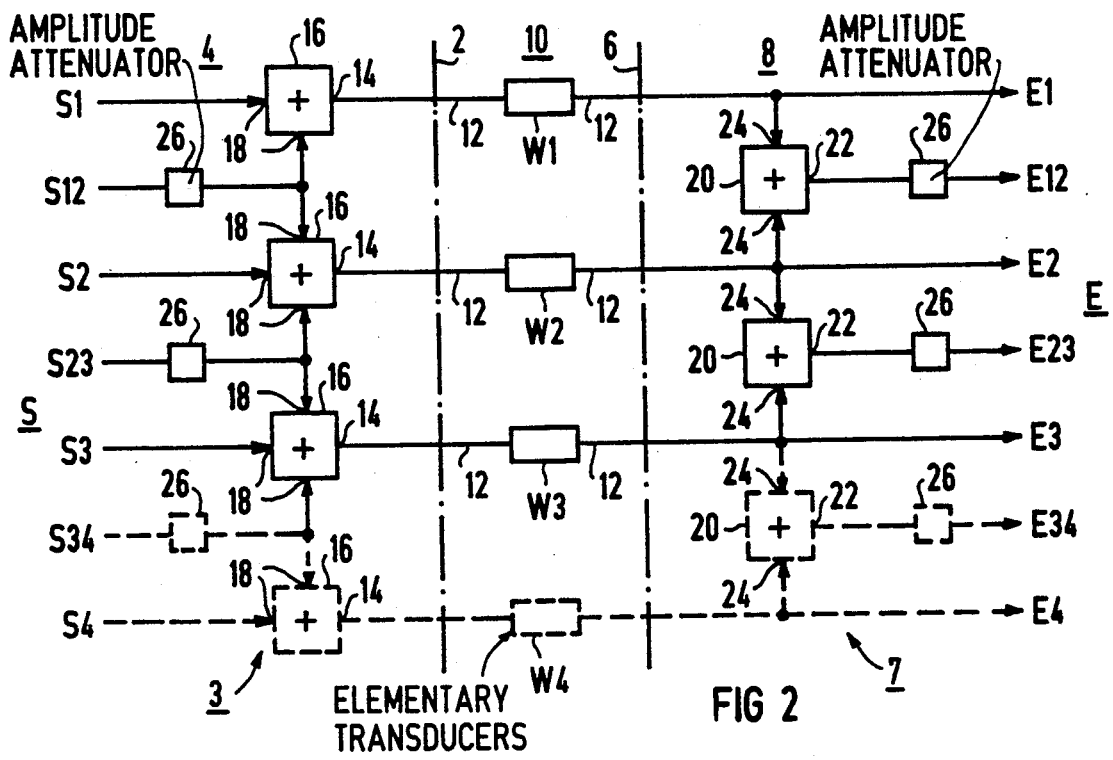
FIG. 2 is a schematic block diagram the transmission and reception channels in an embodiment of an ultrasound apparatus in accordance with the principles of the present invention wherein one or two transducer elements are simultaneously driven or sampled in alternation.
Figure 3:
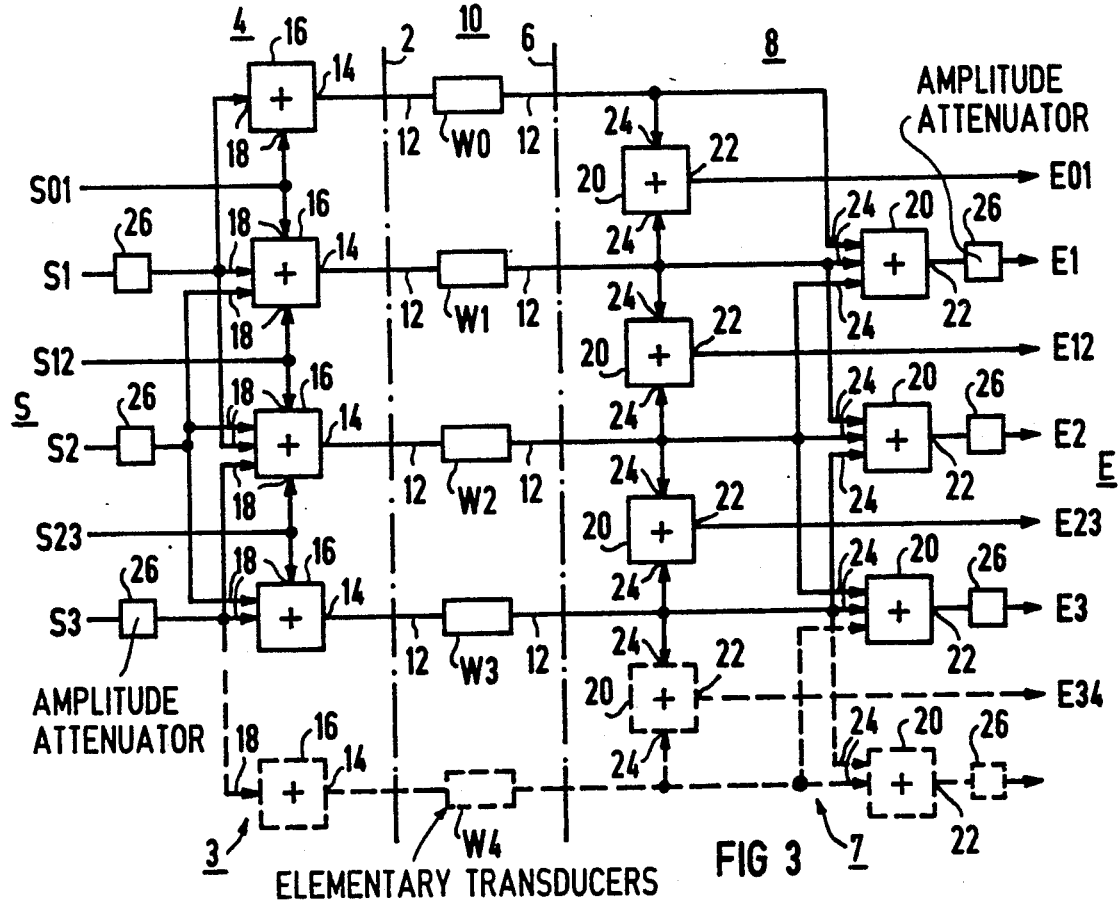
FIG. 3 is a schematic block diagram of the transmission and reception channels for an ultrasound apparatus constructed in accordance with the principles of the present invention wherein two or three elementary transducers are simultaneously driven or sampled in alternation.

FIGS. 2 and 3 show two exemplary embodiments of the transmission and reception transfer stages 3 and 7 in detail. In FIG. 2, the transmission channels S1, S2, S3 ... and the reception channels E1, E2, E3 ... are allocated to a first group of elementary transducers W1, W2, W3 .... The allocation is such that the central transmission and reception location, i.e. the origin of the primary energy beam direction and of the primary sensitivity direction, coincide and lie on the elementary transducers W1, W2, W3 .... In FIG. 2, thus, a transmission signal in the transmission channel S1 generates a central transmission location that lies on the transducer W1. During reception, the reception signal that acts on the transducer W1 in the primary sensitivity direction is essentially forwarded to the reception channel E1. The central reception location that is allocated to the reception channel E1 thus lies on the transducer W1. The respective transmission and reception channels S2, S3 ... and E2, E3 ... are allocated to the elementary transducers W2, W3 ... in the same way.

A second group of respective transmission and reception channels S12, S23, S34 ... and E12, E23, E24 ... is present in addition to the first group of transmission and reception channels S1, S2 ... and E1, E2 .... The transmission channels S12, S23, S34 ... of the second group are respectively connected to neighboring (adjacent) transducer elements W1 and W2, or W2 and W3, etc. via the transmission transfer stage 3. The reception channels E12, E23, E34 ... of the second group respectively connected to neighboring transducer elements W1 and W2, or W2 and W3, etc. via the reception transfer stage 7. When a plurality of neighboring elementary transducers W1, W2 ... are simultaneously excited, the resultant primary energy beam direction is the symmetry axis for all primary energy beam directions of the individual transducers W1, W2, etc. When an even number of elementary transducers is simultaneously excited, the origin of the primary energy beam direction lies between the elementary transducers; a virtual, central transmission location lying between elementary transducers W1, W2 ... is thus formed.

The conditions upon reception are analogous to those upon transmission. When a plurality of neighboring (adjacent) elementary transducers W1, W2 ... receive simultaneously, the resultant primary sensitivity direction is the symmetry axis of the primary sensitivity directions of the individual transducers W1, W2 .... Given the simultaneous sampling of an even number of elementary transducers W1, W2 ..., a virtual, central reception location lying between the elementary transducers W1, W2 . . . can thus be generated.

In order to respectively connect the individual elementary transducers W1, W2, . . . to the transmission channels S1, S2 . . . of the first group as well as to the transmission channels S12, S23 . . . of the second group, a connecting channel 12 is connected to the output 14 of a transmission adder 16. The transmission adders 16 that are connected to the transducer at the edge of the aperture, for example W1, have two inputs 18, whereas the other transmission adders 16 have three inputs 18. Every transmission channel of the first group S1, S2 . . . is connected to an input 18 of a transmission adder 16. By contrast, every transmission channel of the second group S12, S23 is respectively connected to an input 18 of two neighboring transmission adders 16.

Reception adders 20 are provided at the reception side 8, their outputs 22 being respectively connected to the reception channels of the second group E12, E23 . . . . Every reception adder 20 has two inputs 24 that are respectively connectable via the connecting channels 12 to two neighboring elementary transducers W1, W2 . . . . The reception channels of the first group E1, E2 . . . are directly connectable via the connecting channels 12 to the corresponding elementary transducers W1, W2 . . . .

Assumming that the active aperture of the transducer array 10 is composed of n elementary transducers W1 through Wn, then the n transmission channels of the first group S1 through Sn and the reception channels E1 through En generate n central transmission/reception locations that lie on the elementary transducers W1 through Wn. Virtual n−1 transmission and reception locations of n−1 transmission and reception channels of the second group S12 through S(n−1)n or E12 through E(n−1)n are generated between the elementary transducers W1 through Wn. A total of 2n−1 central transmission and reception locations are generated in alternation by the activation of one or two elementary transducers W1 through Wn. In order to balance or compensate different sensitivities between the transmission and reception channels produced as a result thereof, amplitude attenuators 26 are inserted in the transmission and reception channels of the second group. The amplitude attenuators 26 match the channels of the first and second groups in terms of power. It has been shown that the weighing factor with which the amplitudes are weighted by the amplitude attenuators 26 can lie between 0.5 and 1.

The exemplary embodiment of FIG. 3 again shows an ultrasound apparatus having a transmission side 4 and a reception side 8 to which a transducer array 10 can be connected via connecting channels 12. As in FIG. 1, an active aperture is formed of elementary transducers arranged in a row, referenced as W0, W1, W2, W3 . . . for clarity. Analogous to FIG. 2, the first group of transmission and reception channels S1, S2 . . . and E1, E2 . . . are respectively allocated to an elementary transducer W1, W2 . . . . In this embodiment, however, not only the allocated elementary transducers but also neighboring elementary transducers are respectively connected to the transmission and reception channels of the first group. Again the central transmission and reception location effected by every individual transmission and reception channel S1, S2, S3 . . . or E1, E2, E3 . . . lies on the allocated transducer W1, W2, W3 . . . .

For generating the virtual transmission and reception locations lying between the physically existing elementary transducers W0, W1 . . . , two neighboring (adjacent) transducer elements W0 and W1, W1 and W2, etc., are respectively connected to a transmission and reception channel of the second group S01, S12, . . . or E01, E12, . . . The channels of the second group of transmission and reception channels S01, S12 . . . and E01, E12 . . . , as are the second group of the exemplary embodiment of FIG. 2, are respectively connectable to two neighboring elementary transducers.

To be able to correspondingly drive the elementary transducers W0, W1 . . . with the transmission channels of the first and second group S1, S2 . . . or, respectively, S01, S12 . . . , the elementary transducers W0, W1 . . . are connected via selection channels 12 to a respective output 14 of a transmission adder 16. The transmission adders 16 that are connected to the transducers at the edge side of the aperture, for example W0, have two inputs 18; the neighboring (interior) transmission adders 14 have four inputs 18 and the remaining transmission adders have five inputs 18. The transmission channels of the first group S1, S2 . . . are respectively connected to an input 18 of three sequentially adjacent transmission adders 16. By contrast, the transmission channels of the second group S01, S12 . . . are connected to a respective input 18 of two neighboring transmission adders 16.

At the reception side 8, every reception channel E1, E2 . . . and E01, E12 . . . is connected to an output 22 of a reception adder 20. The reception adders 20 that are connected to the reception channels of the first group E1, E2 . . . have three inputs 24. The reception adders 20 that are connected to the reception channels of the second group E01, E12 . . . have two inputs 24. The reception adders are respectively connectable to the connecting channels 12 of neighboring elementary transducers W0, W1 . . . Thus, for example, the reception adder 20 for the reception channel E01 has its input side connectable to the elementary transducers W01 and W1, whereas the reception adder 20 for the reception channel E1 has its input side connectable to the elementary transducers W0, W1 and W2.

In the exemplary embodiment of FIG. 3, two or three elementary transducers W0, W1 . . . are always simultaneously driven are always simultaneously sampled. For activating n elementary transducers W0, W1 . . . in the active aperture, 2n−3 transmission and reception channels S1, S2 . . . and S01, S12 . . . or E1, E12 . . . are provided. A quantity n−2 transmission and reception channels of the first group S1, S2 . . . or E1, E2 . . . are thereby allocated to the elementary transducers W1, W2 . . . . For generating virtual, central transmission and reception locations lying between the elementary transducers W0, W1 . . . , n−1 transmission and reception channels of the second group S01, S12 . . . or E01, E12 . . . are provided.

For compensating sensitivity differences that are produced by the simultaneous activation of two or three elementary transducers in alternation, amplitude attenuators 26 are provided in the transmission reception channels. It has been shown that reducing the transmission and reception amplitudes to 0.6 through 1 of the original value is preferable.

In the two exemplary embodiments of FIGS. 2 and 3, the values of the delays of the transmission and reception signals for the virtually generated transmission and reception locations lie between the values of the delay for the transmission and reception locations on the elementary transducers. In other words: the virtual transmission and reception locations are serviced chronologically differently from the transmission and reception locations lying on the transducers. The delay for the sweep and/or focusing is thus implemented here as in the case of a transducer array having a high number of elementary transducers wherein the number of elementary transducers is equal to the number of transmission and reception channels.

Although further modifications and changes may be suggested by those skilled in the art, it is the intention of the inventors to embody within the patent warranted hereon all changes and modifications as reasonably and properly come within the scope of their contribution to the art.

We claim as our invention:

1. An ultrasound apparatus comprising:
   a first group of transmission channels and reception channels;
   a plurality of elementary transducers in an active aperture of a transducer array, each elementary transducer having at least one transducer channel and at least one reception channel in said first group allocated thereto, each transmission channel having a transmission location generated by the transmission channel disposed on the elementary transducer allocated thereto and each reception channel having a reception location sampled by the reception channel disposed on the elementary transducer allocated thereto and coincident with said transmission location;
   a second group of transmission and reception channels;
   transmission transfer means connected between the transmission channels in said second group and said elementary transducers for generating a plurality of virtual transmission locations respectively disposed between said elementary transducers; and
   reception transfer means connected between the reception channels in said second group and said elementary transducers for sampling a plurality of virtual reception locations respectively disposed between said elementary transducers and coinciding with said virtual transmission locations.

2. An ultrasound apparatus as claimed in claim 1 wherein said transmission transfer means is a means for connecting the transmission channels in said second group to elementary transducers which are symmetrically arranged with respect to said virtual transmission locations, and wherein said reception transfer means is a means for connecting the reception channels in said second group to elementary transducers which are symmetrically arranged with respect to said virtual reception locations.

3. An ultrasound apparatus as claimed in claim 2 wherein said transmission transfer means is a means for connecting said transmission channels in said second group to respective pairs of adjacent transducer elements, and wherein said reception transfer means is a means for connecting the reception channels in said second group to said respective pairs of adjacent elementary transducers.

4. An ultrasound apparatus as claimed in claim 1 wherein said transmission transfer means is a means for connecting the transmission channels in said first group to elementary transducers which are symmetrically arranged with respect to said virtual transmission locations, and wherein said reception transfer means is a means for connecting the reception channels in said first group to elementary transducers which are symmetrically arranged with respect to said virtual reception locations.

5. An ultrasound apparatus as claimed in claim 4 wherein said transmission transfer means is a means for connecting said transmission channels in said first group to respective pairs of adjacent transducer elements, and wherein said reception transfer means is a means for connecting the reception channels in said first group to said respective pairs of adjacent elementary transducers.

6. An ultrasound apparatus as claimed in claim 1 wherein said transmission transfer means consists of a plurality of transmission adders respectively connected to said elementary transducers and between said transmission channels in said first and second groups, and wherein said reception transfer means consists of a plurality of reception adders respectively connected to said elementary transducers and between the reception channels in said first and second groups.

7. An ultrasound apparatus as claimed in claim 6 wherein:
   said active aperture has aperture edges and said transducer array includes two elementary edge transducers respectively disposed at said aperture edges and a remainder of elementary transducers disposed between said elementary edge;
   said transmission adders include two edge transmission adders having respective outputs connected to said elementary edge transducers and a remainder of transmission adders having respective outputs connected to said remainder of elementary transducers;
   each transmission adder has an input connected to a respective one of the transmission channels in said first group;
   each transmission channel in said second group is connected to respective inputs of a pair of transmission adders having respective outputs connected to adjacent elementary transducers so that each of said remainder of transmission adders, has three inputs respectively connected to one transmission channel in said first group and to two transmission channels in said second group, and each edge transmission adder has two inputs respectively connected to one transmission channel in said first group and to one transmission channel in said second group;
   said reception adders include two edge reception adders having respective inputs connected to said elementary edge transducers, and a remainder of reception adders;
   each reception adder has an output connected to a respective one of the reception channels in said second group;
   each of said remainder of elementary transducers is connected to respective inputs of a pair of reception adders having respective outputs connected to adjacent reception channels in said second group elementary transducers so that each of said remainder of reception adders, and is directly connected to a respective one of said reception channels in said first group; and
   each elementary edge transducer is directly connected to a respective one of said reception channels in said first group.

8. An ultrasound apparatus as claimed in claim 7 further comprising:

a first plurality of amplitude attenuators respectively connected between each transmission channel in said second group and said inputs of said pairs of transmission adders; and a second plurality of amplitude attenuators respectively connected between each reception channel in said second group and said outputs of said remainder of reception adders.

9. An ultrasound apparatus as claimed in claim 6 wherein:

said active aperture has aperture edges and said transducer array includes two elementary edge transducers respectively disposed at said aperture edges, two interior elementary transducers disposed adjacent said elementary edge transducers, and a remainder of elementary transducers disposed between said interior elementary transducers;

said transmission adders include two edge transmission adders having respective outputs connected to said elementary edge transducers, two interior transmission adders having respective outputs connected to said interior elementary transducers, and a remainder of transmission adders having outputs respectively connected to said remainder of elementary transducers;

each transmission channel in said first group is connected to respective inputs of three transmission adders having respective outputs connected three sequentially adjacent elementary transducers and each transmission channel in said second group is connected to respective inputs of a pair of transmission adders having respective outputs connected to adjacent elementary transducers, so that each edge transmission adder has two inputs respectively connected to one transmission channel in said first group and to one transmission channel in said second group, each interior transmission adder has four inputs respectively connected to two transmission channels in said first group and to two transmission channels in said first group and to two transmission in said second group, and each of said remainder of transmission adders has five inputs respectively connected to three transmission channels in said first and to two transmission channels in said second group;

said reception adders include a first set and a second set of reception adders, and an edge reception adder;

said first set of reception adders each having two inputs respectively connected to respective pairs of adjacent elementary transducers, and an output connected to a respective one of said reception channels in said second group;

said second set of reception adders each having three inputs respectively connected to respective trios of sequentially adjacent elementary transducers, and an output connected to a respective one of said reception channels in said first group; and said edge reception adders having two inputs respectively connected to one of said elementary edge transducers and an interior elementary transducer adjacent thereto, and an output connected to a respective one of said reception channels in said first group.

10. An ultrasound apparatus as claimed in claim 9 further comprising:

a first plurality of amplitude attenuators respectively connected between each transmission channel in said first group and said inputs of said second set of transmission adders; and a second plurality of amplitude attenuators respectively connected between each reception channel in said first group and said outputs of said three reception adders and said output of said edge reception adder.

11. An ultrasound apparatus as claimed in claim 1 wherein each elementary transducer has one transducer channel and one reception channel in said first group allocated thereto.

* * * * *